United States Patent [19]

Varshney et al.

[11] Patent Number: 5,427,823
[45] Date of Patent: Jun. 27, 1995

[54] LASER DENSIFICATION OF GLASS CERAMIC COATINGS ON CARBON-CARBON COMPOSITE MATERIALS

[75] Inventors: Usha Varshney, Radford, Va.; Howard P. Groger, Gainesville, Fla.; Jesse J. Brown, Jr., Christiansburg, Va.

[73] Assignee: American Research Corporation of Virginia, Radford, Va.

[21] Appl. No.: 113,927

[22] Filed: Aug. 31, 1993

[51] Int. Cl.$^6$ ............................................. B05D 1/08
[52] U.S. Cl. ........................ 427/446; 427/452; 427/453; 427/553; 427/180; 427/554
[58] Field of Search ............... 427/452, 453, 553, 554, 427/180, 204, 446; 428/408

[56] References Cited

U.S. PATENT DOCUMENTS

| | | |
|---|---|---|
| 3,902,545 | 9/1975 | Domicone et al. . |
| 3,911,998 | 10/1975 | Domicone et al. . |
| 3,927,223 | 12/1975 | Takabatake et al. ............... 427/34 |
| 3,951,673 | 4/1976 | Isohata et al. . |
| 3,988,405 | 10/1976 | Smith et al. . |
| 4,157,923 | 6/1979 | Yen et al. ............................ 148/4 |
| 4,209,229 | 6/1980 | Rittler . |
| 4,358,541 | 11/1982 | Andrus et al. . |
| 4,385,127 | 5/1983 | Chyung . |
| 4,440,810 | 4/1984 | Forker, Jr. . |
| 4,476,150 | 10/1984 | Rose ...................................... 427/10 |
| 4,495,255 | 1/1985 | Draper et al. ..................... 428/669 |
| 4,503,128 | 3/1985 | Iseli et al. .......................... 428/446 |
| 4,716,572 | 12/1987 | Kühn et al. ......................... 373/88 |
| 4,814,232 | 3/1989 | Bluenge et al. . |
| 4,852,347 | 8/1989 | Reynolds et al. . |
| 4,901,787 | 2/1990 | Zornes . |
| 5,143,533 | 9/1992 | Brusasco .......................... 65/18.1 |
| 5,153,070 | 10/1992 | Andrus et al. .................... 428/408 |
| 5,284,806 | 2/1994 | Gadkaree ............................. 501/8 |

FOREIGN PATENT DOCUMENTS

| | | |
|---|---|---|
| 0289903 | 4/1988 | European Pat. Off. . |
| 63-25280 | 2/1988 | Japan . |
| WO88/03519 | 5/1988 | WIPO . |

*Primary Examiner*—Shrive Beck
*Assistant Examiner*—Brian K. Talbot
*Attorney, Agent, or Firm*—Dickstein, Shapiro & Morin

[57] ABSTRACT

Alumino-silicate glass-ceramic coated carbon-carbon composite and graphitic substrates having resistance to oxidation and thermal cycling. The coatings are fabricated from plasma-sprayed powders of beta-spodumene, cordierite, beta-eucryptite or beta-quartz and are rapidly recrystallized by laser processing.

18 Claims, 19 Drawing Sheets

515 W/cm²    743 W/cm²

HOMOGENEOUS COATING

990 W/cm²    1238 W/cm²

GLASSY BEADS
WHITE BEADS
PHASE SEPARATION
PHASE SEPARATION

1485 W/cm²

494 W/cm² 740 W/cm²

HOMOGENEOUS COATING

987 W/cm² 1234 W/cm²

HOMO-GENEOUS COATING

1481 W/cm² 1974 W/cm²

1273 W/cm² 1528 W/cm²

1783 W/cm² 2037 W/cm²

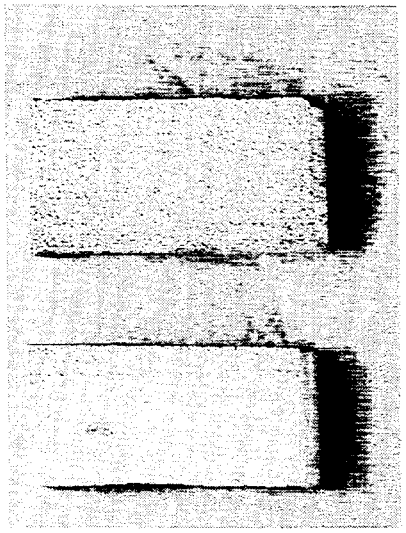
FIG. 7A
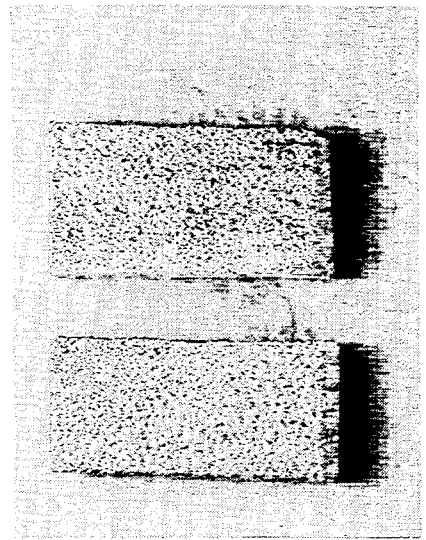
FIG. 7B
FIG. 7C

CORDIERITE

PLASMA　　　　382 W/cm² 　509 W/cm²
SPRAYED,　　　DENSE
AS-DEPOSITED  HOMOGENEOUS
　　　　　　　　COATING

β-spodumene

PLASMA　　　　382 W/cm² 509 W/cm²
SPRAYED,　　　DENSE
AS-DEPOSITED  HOMOGENEOUS
　　　　　　　　COATING

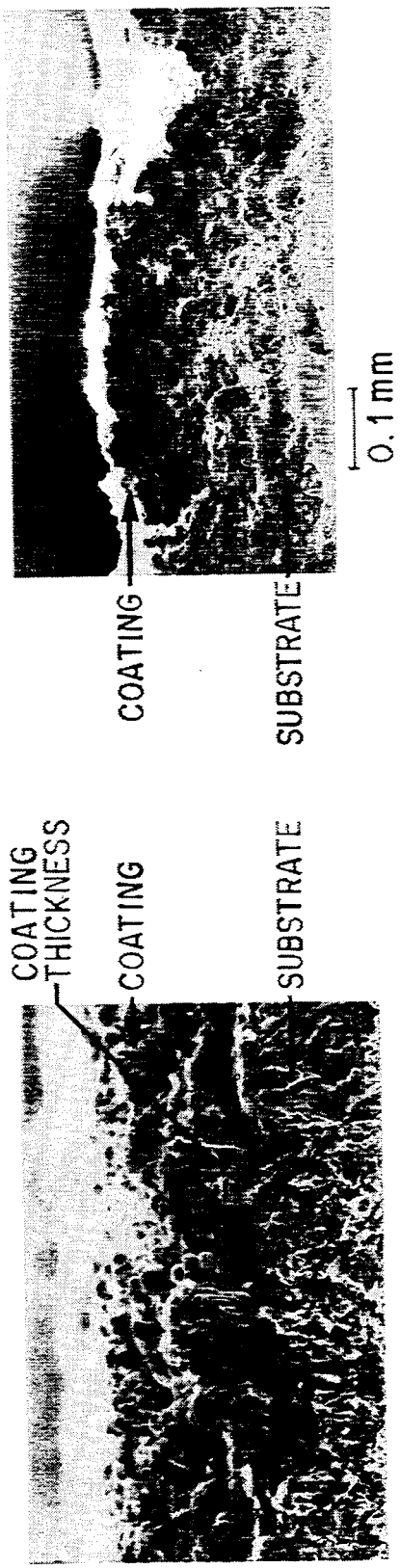
FIG. 9A
FIG. 9B
FIG. 9C

FIG. 11B 764 W/cm² CRACKS
FIG. 11D 1237 W/cm²
FIG. 11A 509 W/cm² CRACKS
FIG. 11C 1019 W/cm² CRACKS

CARBON FIBERS
CARBON FIBERS

5,427,823

LASER DENSIFICATION OF GLASS CERAMIC COATINGS ON CARBON-CARBON COMPOSITE MATERIALS

FIELD OF THE INVENTION

This invention relates to laser-densified, glass-ceramic coatings for carbon-carbon composite materials and methods for their fabrication. The materials are capable of withstanding high temperature thermal cycling. Accordingly, the materials are well-suited for applications requiring long term structural stability at temperatures up to about 1725 K.

BACKGROUND OF THE INVENTION

Carbon-carbon composite materials are known to exhibit excellent mechanical properties and structural integrity up to 2775 K. in a vacuum. In oxidative conditions, however, at temperatures above 1075 K., carbon-carbon composite materials are rapidly degraded.

A review of the coatings for carbon-carbon composite materials for oxidation resistance has been presented by Wittmer, D. T., "Protective Coatings for Carbon-Carbon Composites," Metal Matrix, Carbon and Ceramic Matrix Composites, NASA Conference Publication 2482, pp. 381-94 (1987). Wittmer identified the problems inherent with brittle SiC, TiC and $Si_3N_4$ coatings for high temperature cyclic oxidation resistance. Silicon carbide coatings have been used to protect carbon-carbon composite materials from oxidation. However, such coatings and carbon-carbon composites exhibit different thermal expansion characteristics. These differences, and the resulting effects of temperature on coating adherence and strength, significantly reduce the applicability of silicon carbide coatings in applications involving thermal cycling. The use of low thermal expansion materials has been suggested by Kerans, R. J. et al., "Low Thermal Expansion Coatings for Carbon-Carbon Composites," Metal Matrix, Carbon and Ceramic Matrix Composites, NASA Publication 2482, pp. 409-25 (1987).

Literature also exists on a variety of coating systems involving laser processing of plasma-sprayed, ceramic materials. Iwamoto, N. et al., "Surface Treatment of Plasma-Sprayed Ceramic Coatings by a Laser Beam," Surface and Coatings Technology, vol. 34, no. 1, pp. 59-67 (1988), discusses laser treatment to densify plasma-sprayed alumina and zirconia coatings. Leong, K. et al., "Development of High Temperature Oxidation-Resistant Materials for Tactical Missiles," Report NSWC TR 87-244 for the Naval Surface Weapons Center (1986), discusses laser processing of plasma deposited hafnium diboride, hafnium carbide and zirconium carbide coatings. U.S. Pat. No. 4,814,232 to Bluege et al., describes a method of making a mirror, consisting of a readily polishable metal or ceramic intermediate layer applied to a mirror substrate by plasma spray techniques. The outer surface of the intermediate layer may be smoothed by a high energy beam. A reflective coating layer is then applied to the polished intermediate layer.

Despite the advancements in the art, there is still a need for dense, defect-free coatings, capable of protecting carbon-carbon composite materials under oxidative high temperature conditions and having adhesive properties and coefficients of thermal expansion that are compatible with carbon-carbon composite and graphitic materials, and efficient methods for fabricating such coatings.

SUMMARY OF THE INVENTION

Accordingly, it is an object of the present invention to provide a protective coating for carbon-carbon composite and graphitic materials.

It is also an object of this invention to provide coatings having stopping power against atomic oxygen and being capable of withstanding thermal cycling up to about 1725 K. for extended periods of time.

It is a further object of this invention to provide methods for fabricating protectively coated carbon-carbon composite and graphitic materials.

It is another object of this invention to provide plasma-spray and laser processing techniques for the fabrication of defect-free or substantially defect-free, glass-ceramic coatings useful for oxidation resistant, high temperature thermal cycling applications.

Additional objects and advantages of the invention will be set forth in part in the description which follows, and in part will be obvious from the description, or may be learned by practice of the invention. The objects and advantages of the invention will be attained by means of instrumentalities and combinations particularly pointed out in the appended claims.

To achieve the objects and in accordance with the purpose of the invention, as embodied and broadly described herein, a method is provided for fabricating a glass-ceramic coated carbon-carbon or graphitic substrate by plasma-spraying a beta-spodumene, cordierite, beta-eucryptite or beta-quartz powder at an atmospheric or sub-atmospheric pressure to form an amorphous film having a thickness up to about 1000 microns, and most preferably from about 75 to 200 microns, on the surface of the substrate. The amorphous film is then recrystallized by laser processing at a laser power density in the range of from about 100 to about 3000 $W/cm^2$ and a scanning rate in the range of from about 0.05 to about 7.5 cm/sec. Laser processing recrystallizes and densifies the amorphous layer, resulting in substantially uniform grain size.

In another embodiment, the as-deposited amorphous film is plasma sprayed and laser alloyed with a refractory metal oxide alloying agent, selected from the group consisting of $HfO_2$, $ZrO_2$, $Mo_2O_3$, $Ta_2O_5$ and $Y_2O_3$, which is plasma sprayed onto the glass ceramic coating with a thickness up to about 100 microns and then laser alloyed to form a high temperature oxidation resistant coating. A suitable nitride may be added to the refractory metal oxide by incorporation into the plasma sprayed powder, by slurry coating onto the refractory oxide surface, or by chemical vapor deposition (CVD). Suitable nitrides can include $Si_3N_4$, HfN or ZrN.

In a particularly preferred embodiment, the invention provides a method for protecting a carbon-carbon composite or graphitic substrate material against oxidation and high temperature thermal cycling, by forming an alumino-silicate glass-ceramic coating. The outer surface of the substrate is first roughened by grit-blasting to improve the adhesiveness of the coating. A beta-spodumene powder, having a size in the range of from about 44 microns to about 120 microns is then plasma-sprayed at a pressure in the range of from about 100 Torr to about 760 Torr, to form an amorphous film having a thickness up to 1000 microns on the roughened surface of the substrate. The amorphous film is then rapidly re-crystallized by scanning with a laser beam, the beam having a laser power density in the range of from about 100 to about 3000 W/cm$^2$ and a scan rate in the range of from about 0.05 to about 7.5 cm/sec. The process results in a defect-free, glass-ceramic coating of near theoretical density and substantially uniform grain size of less than about one micron.

According to another preferred embodiment, cordierite powder is employed in the place of beta-spodumene. Other suitable glass-ceramics, such as beta-eucryptite, beta-quartz and others may also be utilized, provided they have adhesive properties and coefficients of thermal expansion that are compatible with the particular substrate material which is desired to be protected. A refractory metal oxide may be applied to the amorphous film as a plasma-deposited top coat prior to laser processing. Multiple ceramic and ceramic-metallic layers may also be applied.

The accompanying figures, which are incorporated in and constitute a part of the specification, illustrate embodiments of the invention and, together with the description, serve to explain the principles of the invention.

BRIEF DESCRIPTION OF THE DRAWINGS

FIG. 7 shows optical photographs of beta-spodumene with top coats of niobium plasma-sprayed at 760 Torr on graphite substrates, as a function of laser power density, at a scanning rate of 0.25 cm/second (2×).

FIG. 9 shows scanning electron micrographs showing a cross-sectional view of cordierite coatings on graphite substrates.

FIG. 11 shows optical micrographs of cordierite plasma-sprayed at 200 Torr on graphite substrates, as a function of laser power density, at a scanning rate of 1.27 cm/second (30×).

DETAILED DESCRIPTION OF THE INVENTION

Figure 1:
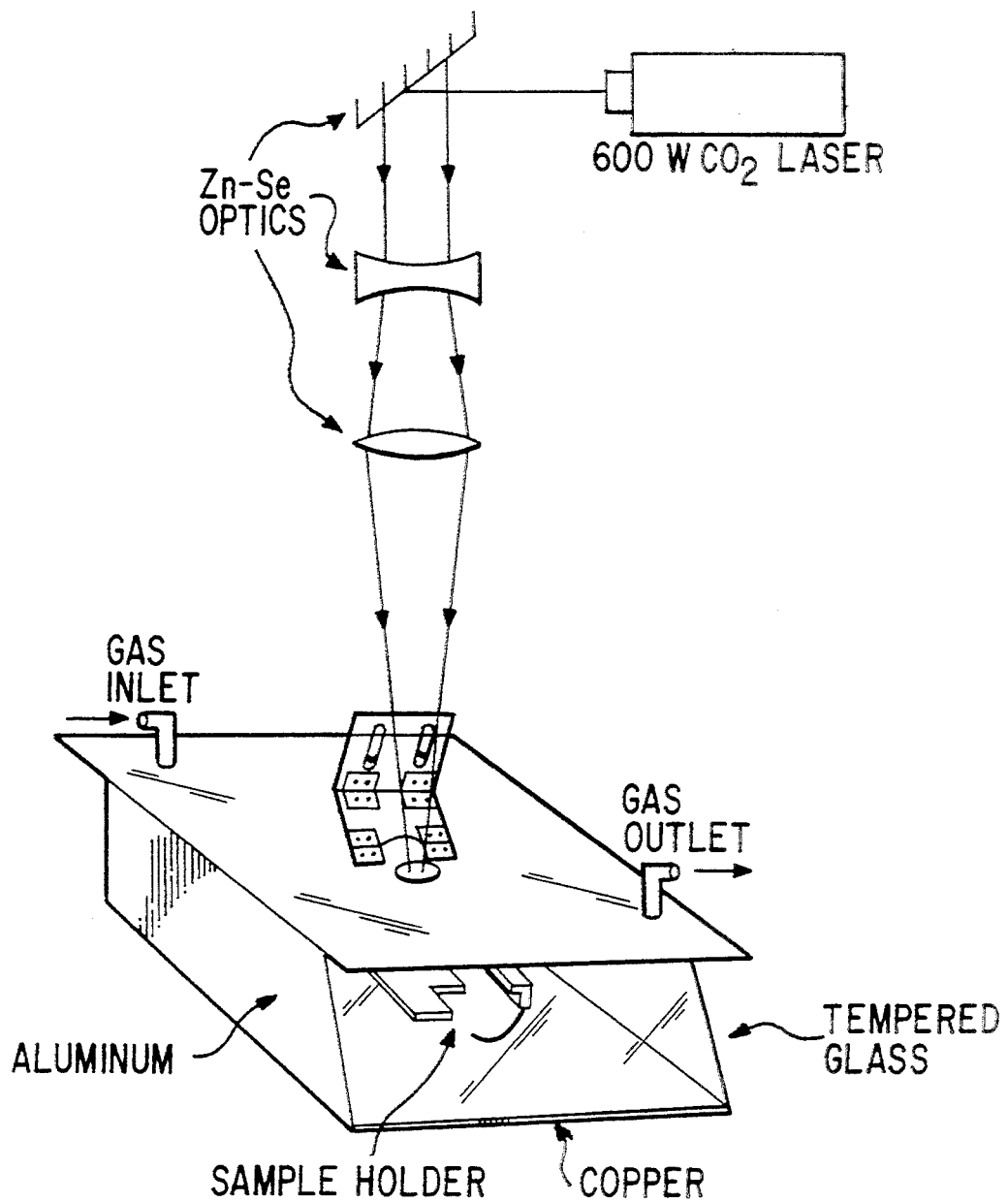
FIG. 1 illustrates a laser processing reactor for densification of plasma-sprayed films.
Figure 2A:
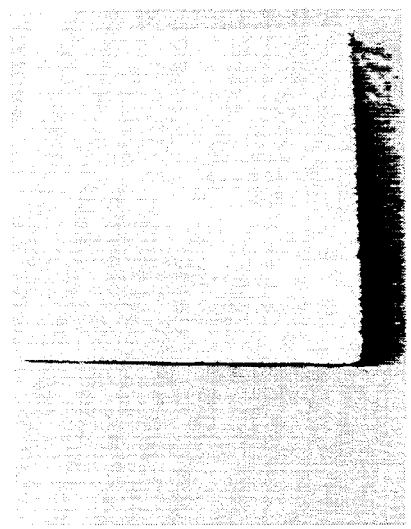
FIG. 2 shows optical photographs of cordierite coatings plasma-sprayed at 760 Torr on graphite substrates, as a function of laser power density, at a scanning rate of 0.25 cm/second (2×).
Figure 2B:
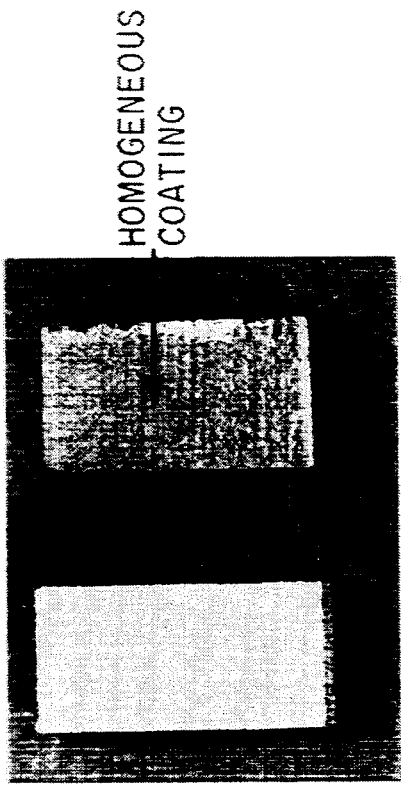
Figure 2C:
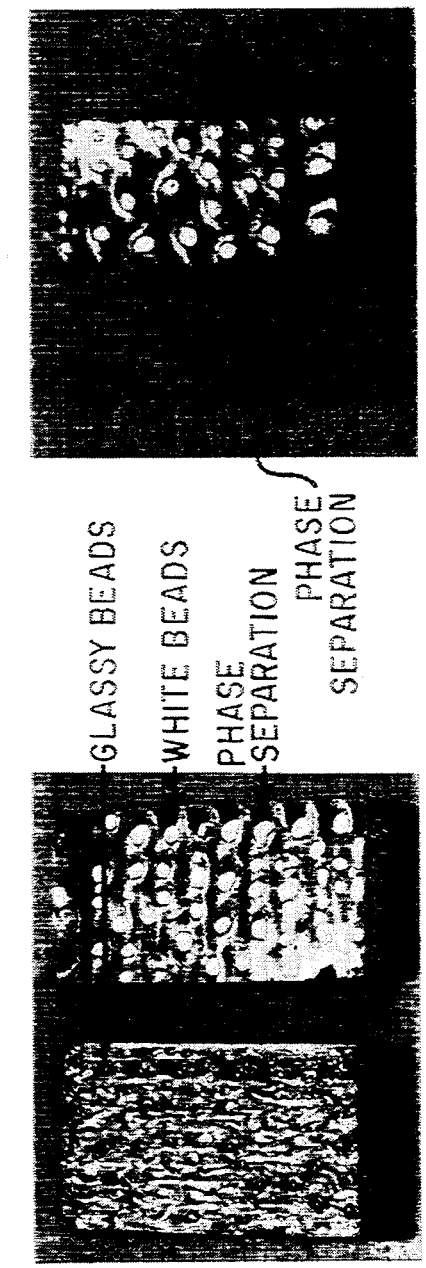
Figure 2D:
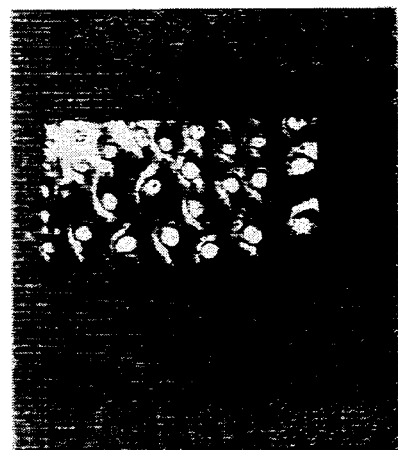

Reference will now be made in detail to the presently preferred embodiments of the invention, which, together with the following example, serve to explain the principles of the invention.

We have found that laser alloying of plasma-sprayed coatings in the alumino-silicate family on carbon-carbon composites and graphitic substrates results in particularly favorable oxidation resistance, atomic oxygen stopping power and thermal control properties upon recrystallization by laser annealing. The materials and methods of the invention provide low-expansion ceramic coatings on carbon-carbon composite and graphitic materials and exhibit excellent survivability under oxidative thermal cyclic conditions. The survivability of these adherent coatings results in part from the match of thermal expansion characteristics of the glass-ceramic coating and the carbon-carbon composite or graphitic substrate.

The invention also relates to an essentially two-step process for depositing a dense, defect-free coating. The technique according to this invention includes plasma spraying one or more layers of ceramic or ceramic-metallic materials, followed by laser alloying and annealing. The as-deposited, plasma-sprayed coatings are amorphous and have densities depending upon whether the mode of plasma-spray deposition is atmospheric or subatmospheric. Laser alloying and laser annealing processes then produce a recrystallized coating having near theoretical density. The invention also permits characterizing the coatings prior to and after thermal shock, using scanning electron microscopy, optical microscopy and X-ray diffraction analysis.

The laser processed coatings are strongly adherent to the substrate surfaces, as evidenced by scratch test results and scanning electron micrographs. X-ray diffraction analysis indicates that the laser annealed coatings according to this invention are crystalline in nature. This represents a significant discovery in the area of plasma-deposited coatings for carbon-carbon composite materials in that conventional furnace annealing may take up to 40 hours at 850° C. whereas recrystallization is accomplished by laser annealing in a few seconds.

The plasma-spraying and laser-processing steps according to the invention can be used to densify coatings on a variety of substrates. We have found, however, that laser recrystallization of as-deposited, plasma-sprayed alumino-silicate materials on carbon-carbon composite and graphitic substrate materials results in exceptional levels of protection for such substrates. These substrate materials are also well-suited structurally to low earth orbit ("LEO") and other high temperature applications. Therefore, the preferred substrate materials according to the invention are the carbon-carbon composite and graphitic materials, including, for example, graphite-magnesium.

With respect to the coating materials, the family of alumino-silicate glass-ceramics exhibit favorable thermal arid mechanical properties, ease of processing, high density and a wide range of coefficients of thermal expansion (CTE). The coefficients of thermal expansion of members of the alumino-silicate family may also be altered through careful selection of chemical composition, as found in the work of Loehman, R. E. and Meadley, T. J., "Design of High Thermal Expansion Glass-Ceramics through Microstructural Control," Ceramic Microstructures, Materials Science Research (Joseph A. Pask and Anthony G. Evans ed. ), Plenum Press. New York and London, pp. 33–43 (1986) (incorporated herein by reference), which showed that CTEs ranging from $-8.6 \times 10^{-6}/°C$ to $+50 \times 10^6/°C$ may be achieved using beta-eucryptite, beta-spodumene, lithium disilicate, quartz, cristobalite and tridymite. Thus, alumino-silicate glass-ceramic materials work well as coatings for carbon-carbon composite and graphitic substrate materials because of the tailorable CTEs and the protection against atomic oxygen provided by this class of ceramics. These ceramic materials also have high operating temperatures, which can exceed 1725 K. The alumino-silicate glass-ceramics therefore provide thermal control coatings with high mechanical strength and resistance to thermal shock. They can also advantageously produce translucent or optically clear coatings having low microwave and millimeter wave losses.

Particularly preferred alumino-silicate glass-ceramic materials according to this invention include beta-spodumene ($Li_2O$—$Al_3O_3$—$4SiO_2$), cordierite ($2MgO$—$2Al_2O_3$—$5SiO_2$), beta-eucryptite ($Li_2O$—$Al_2O_3$—$2SiO_2$) and beta-quartz ($SiO_2$). As will be described in detail below, powders of these glass-ceramic materials are plasma-sprayed to form an amorphous coating on substrate materials, which coating is then densified by laser processing.

The low thermal expansion of the preferred glass-ceramics is particularly favorable for applications involving sudden thermal changes. Another principal advantage over more conventional ceramics is the absence of porosity in the recrystallized materials. The preferred glass-ceramic materials consist of a large portion of well-dispersed small crystals, generally smaller than 1 micron, along with a small amount of residual glass phase. The particular material properties can also be programmed to a significant extent by a systematic variation of the chemistry and microstructure of the starting materials containing both glassy and crystalline phases and by the selection of suitable crystallization process conditions. The coefficients of thermal expansion of these preferred glass-ceramics are also compatible with carbon-carbon composites and graphite materials over a wide temperature range and have tailorable coefficients of thermal expansion ranging from 0.5 to $5.0 \times 10^{-6}/°C$.

With respect to the thermal and mechanical properties of glass-ceramics having oxydation resistance and stopping power for protection against atomic oxygen, beta-quartz ($SiO_2$), beta-spodumene ($Li_2O$—$Al_2O_3$—$4SiO_2$), beta-eucryptite ($Li_2O$—$Al_2O_3$—$2SiO_2$) and cordierite ($2MgO$—$2Al_2O_3$—$5SiO_2$) are the most favorable. The coatings for carbon-carbon or graphitic materials according to the present invention include at least one layer of at least one of these preferred glass-ceramic materials, and can also comprise several similar or alternating layers. Each layer may also include a refractory metal oxide as a top coat which is plasma sprayed onto the glass ceramic coating and then laser alloyed.

It is very desirable that the crystallites be small (preferably less than 1 micron) and uniform in size. Conventional crystallization in glasses is followed by the crystals growing into the amorphous phase and producing a nonuniform body of large grain size. Obtaining small crystallites throughout the glass material thus requires a uniform density of nuclei on the order of $10^{12}$ to $10^{15}/cm^3$. Such copious nucleation may be achieved by adding selected alloying agents to the glass during the melting operation. Platinum group and noble metals may be used as alloying agents according to the present invention. These agents function by directly forming a crystalline nucleating phase in a precipitation process.

Nucleation, for the production of small, uniform crystallites, is also achievable through non-metal alloying. Such processes may include the use of oxide alloying agents, for example, $HfO_2$, $ZrO_2$, $Ta_2O_5$, $Mo_2O_3$ or $Y_2O_3$, plasma sprayed to a thickness of up to 100 microns and laser alloyed. A suitable nitride may be incorporated in the plasma spray powder, deposited by slurry coating or by chemical vapor deposition to improve the coating's mechanical properties. Suitable nitrides include $Si_3N_4$, $HfN$ or $ZrN$.

In many cases, these melt additions effect a phase-separation process. The separation provides a fine dispersion of second-phase material, which then forms a crystalline nucleant phase. The role of phase separation in the nucleation process is associated with a number of factors, including the formation of an amorphous phase of relatively high mobility in a temperature range in which there is a large driving force for crystallization, allowing crystal nucleation to occur rapidly. Other factors may include the introduction of second-phase boundaries between the phase-separated regions in which the nucleation of the first crystalline phase may take place, or the provision of a driving force for crystallization in cases in which no such driving force exists for the homogeneous solution.

Thus, by the use of suitable alloying agents it is possible to produce recrystallized glass-ceramic coatings having both an increased melt temperature and a substantially uniform grain size in the range of from about 0.02 to about 1.2 microns. Preferably, the grain size is smaller than 1 micron in order to achieve a dense, protective coating. By the use of suitable laser processing conditions as explained below, a glass-ceramic coating exhibiting small grain size and near theoretical density is obtained upon recrystallization of a plasma-sprayed film.

According to one embodiment, a carbon-carbon composite substrate is coated with an alumino-silicate glass-ceramic material and a thin top coating consisting of a refractory metal. The top coat may be any refractory metal oxide, but is preferably $HfO_2$, $ZrO_2$, $Mo_2O_3$, $Ta_2O_5$ or $Y_2O_3$. A refractory nitride may be added to the oxide to provide improved mechanical properties. We have found that multi-layered coatings using niobium remain crack free after recrystallization by laser alloying and annealing, and will provide exceptional oxidation resistance and atomic oxygen stopping power at cyclic temperatures from 77 K. to 725 K., encountered during LEO.

Prior to plasma-spraying, it is preferable that the substrate is appropriately pre-treated so as to enhance the adhesive properties of the coating material. Any suitable method of roughening the surface of the substrate may be used. Thus, procedures such as grit-blasting may be employed to improve coating adherence by providing a substrate surface roughness in the range of from 12.4 to 25.4 microns rms and, preferably, about 20 microns, rms.

Commercially available powders are then plasma-sprayed to produce thick amorphous coatings of alumino-silicate glass-ceramics and refractory metal oxides as a top coat on the substrate materials. Low pressure plasma spraying at about 200 Torr produces a dense uniform adherent coating. Both atmospheric and low pressure plasma deposition processes, however, can be used to produce coatings on substrate materials. Suitable plasma spray parameters result in the deposition of dense, adherent and reproducible coatings having thicknesses up to about 1000 microns, and preferably in the range of 75 to 200 microns. Other appropriate thicknesses may be applied, depending on the particular application under consideration, and may be readily determined without undue experimentation given the teachings herein.

The as-deposited, plasma-sprayed alumino-silicate materials according to the invention are amorphous coatings with large degrees of porosity. Powder sizes suitable to achieve homogeneous coatings for the laser processing step according to the present invention are in the range of from about 10 to about 140 microns. Most preferably, the powder is in the range of from about 60 to 90 microns and consists of beta-spodumene, beta-eucryptite, cordierite or beta-quartz. Other suitable powders or grain sizes may also be successfully employed, depending on the particular plasma-spray conditions and results desired.

Various plasma gases may also be used, provided they are inert with respect to the glass-ceramic powder, the substrate and any prior-deposited coatings. The preferred gases are argon and helium. The gas flow rates may range from about 0.2 to about 2.0 m$^3$/hour, depending upon the powder feed rates, which may range from between about 0.25 to about 1.75 Kg/hour, and the plasma power and pressure, which may range from about 15 to about 60 kW and up to about 760 Torr, respectively. Other useful flow rates and feed rates may be readily determined by one of ordinary skill in the art, given the teachings herein.

Laser processing is then used to rapidly recrystallize the plasma-sprayed coatings. Convective melt and rapid solidification associated with laser alloying and laser annealing produce an adherent, dense crystalline ceramic coating. The laser transfers heat to the coating via a photon-photon conversion, leading to destabilization of the thermal equilibrium of the region under the beam. It is known that mass transport during laser alloying is driven by convection in the melt, even though the average diffusion length available after the formation of a liquid phase greatly exceeds the solid-state diffusion length. Fluid dynamic drag associated with laser beam scanning over a melted surface layer contributes to the degree of mixing, thereby producing a homogeneous melt which may form clustering or polymeric associations. It has been suggested that the formation of clusters in the laser melt may act to produce a volume nucleation which results in a homogeneous crystalline state.

Another advantageous aspect of laser processing of plasma-sprayed, glass-ceramic coatings is the heat transfer from the molten glass to the substrate. At optimum laser power levels, the rapid solidification induced through cooling by the substrate results in decreased phase segregation of the glassy ceramic material. Laser recrystallization thus improves diffusion of nucleating materials through the melt through convective motions developed during ultra-rapid heating. Optimal laser power levels according to the processes of the present invention are in the range of from about 100 to about 3000 W/cm$^2$ and, most preferably, about 2000 to 2500 W/cm$^2$.

The laser annealing process has advantages over conventional furnace annealing in that the crystallization is extremely rapid, taking several seconds to complete as compared to 6 to 48 hours of annealing in conventional furnace treatment. The method of depositing an amorphous glassy ceramic coating and recrystallizing the coating to form a dense coating has several other advantages over conventional ceramics processing. These include flexibility and ease of forming, uniformity and reproducibility of properties, ability to produce unique properties inherent in extremely fine-grained crystalline materials, lack of porosity, and process economy in high-volume manufacturing. Particularly preferred equipment for the laser processing of glass-ceramics according to this invention includes high power $CO_2$ lasers, Nd-YAG or Excimer lasers. Other high energy beams, including electron beams, ion beams, high energy accoustics and others may also be used to densify the glass-ceramic coatings of the invention.

A wide range of plasma-spray and laser alloying parameters may be employed to fabricate coatings having varying properties related to adhesion, crystallinity and defect structure. Depending upon the selected laser power density, the scanning rate may range from about 0.05 to about 7.5 cm/sec. The preferred scanning rate is about 5.0–7.0 cm/sec. High laser power densities and fast scanning rates achieve a dense, defect-free adherent crystalline coating. Overlap of scanning paths by about 25% of the beam size is also desirable.

The results of characterization by scanning electron microscopy, X-ray diffraction and optical microscopy indicate that the as-deposited, plasma-sprayed specimens are crystallized by laser annealing and are bound to the graphite and carbon-carbon substrate materials. This is demonstrated by subjecting the coated specimens to thermal shock conditions through oven heating to temperatures in excess of 1375 K., followed by immersion in liquid nitrogen at 77 K., and repeating the cycle multiple times. Coated specimens survive exposure to temperatures as high as 1375 K. with no apparent microstructural changes, as indicated by scanning electron microscopy. The resultant adherence of the coatings to the substrate are sufficient to reduce the need for any out-of-plane reinforcements.

The coating systems according to the present invention thus exhibit favorable properties for protection against high temperature oxidation. It is expected that the coating systems will find application in the protection of carbon-carbon, graphite, graphite-magnesium and polymeric materials exposed to extended high temperature thermal cycling.

The invention also provides high-temperature protective coatings with well-matched coefficients of thermal expansion for carbon-carbon and graphite-magnesium composite materials for high temperature applications. There are many potential uses for a defect-free ceramic coating capable of protecting thin materials against atomic oxygen, while at the same time serving as a thermal control surface. Benefits may also flow from the present invention by the fabrication of coatings with favorable electromagnetic and mechanical properties for use in high temperature structures exposed to oxidative and hygrothermal environmental conditions. The coating systems will find application in aerospace and high performance turbine engine technology programs which have a need to protect against oxidation for advanced carbon-carbon composite materials. The ceramic-coated composite materials of the invention may also find applications for intermediate and high temperature energy conversion, materials processing requirements, high temperature sensors and as structural coatings for biomedical applications.

EXAMPLE

In the following example, optimal plasma deposition parameters were determined by depositing a variety of coatings on carbon-carbon composites and graphite substrates under atmospheric conditions (760 Torr) using a Bay State plasma gun (PG-100) having a Plasmadyne control console (SP-A-000A) and a Plasmadyne power supply (PS-61 N). Plasma spraying parameters are shown in Table I below. A particle size of −200 to +325 mesh was observed to be favorable for spraying cordierite and beta-spodumene powders. Several of the cordierite and beta-spodumene coatings sprayed on carbon-carbon composites and graphite substrates were top coated with niobium using the plasma spray parameters as shown in Table I. Plasma spray parameters were not optimized for all compounds and conditions.

Low-pressure (200 Torr) plasma spraying was performed using a Plasmadyne gun (SG-100) with subsonic nozzle model 145. Cordierite and niobium powders with an average particle size of −200 to +325 mesh were deposited on carbon-carbon composites and graphite substrates using the plasma spray parameters shown in Table I. The substrates were mounted on an electronically controlled X-Y translator.

TABLE I

| | Plasma Spray Parameters | | | | | | |
|---|---|---|---|---|---|---|---|
| Sample | Pressure (Torr) | Plasma Power (kW) | Powder Feed Rate (kg/hr) | Prim. Gas Flow Rate Argon ($m^3$/hr) | Sec. Gas Flow Rate Helium ($m^3$/hr) | Spray Distance (cm) | Coating Thickness (cm) |
| Cordierite | 760 | 21 | 0.5 | 1.13 | 0.85 | 10 | .020 to .025 |
| B-spodumene | 760 | 21 | 0.5 | 1.13 | 0.85 | 10 | .013 and .030 |
| Niobium | 760 | 15 | 1.0 | 1.70 | 0.71 | 10–15 | .013 |
| Cordierite | 200 | 28.5 | 1.5 | 1.12 | 0.28 | 15.2 | .025 to .030 |
| Niobium | 200 | 21.6 | 0.7 | 0.56 | 0.28 | 15.2 | .013 |

Plasma-sprayed films were laser annealed using a laser processing reactor as shown in FIG. 1. The reactor is capable of being heated to 400° C. in an inert environment to avoid cracking and peeling of the film from the substrate due to thermal shock during laser processing and to improve thermal stability of the carbon-carbon composite and graphite substrates. Laser annealing was performed using a 600 W, fast axial flow, $CO_2$ laser (for example, Spectra Physics Model 810) in a continuous wave (CW) mode in conjunction with a 6-axis CNC motion control system (for example, aerotech Unidex 16). The laser reactor and the heating attachment were mounted on the 6-axis motion control system. The cover plate was attached to the laser beam guide by means of a hinge allowing only Z-axis movement. Argon gas flowed constantly into the reactor chamber during laser processing. Since the cover plate remained stationary, the laser was allowed to scan a 7.62×7.62 cm area. Various laser parameters were investigated on cordierite and beta-spodumene coated carbon-carbon composites and graphite substrates using a laser spot size of 0.5 cm at a step increment of 0.13 cm at consecutive laser scans. Several samples were prepared having a Niobium top coat.

Oxidation-resistant materials were made using the substrates and powders having the thermal and mechanical properties shown in Tables II and III. Several grades of graphite surface roughness are shown, including as-cut with surface roughness of 12.4–25.4 microns rms, ground and lapped and grit-blasted. The graphite specimens were saw-cut to 0.3×2.5×2.5 cm, ground and grit-blasted with 46 and 16 mesh alumina powder at a pressure of 40 psi. Carbon-carbon composite materials measuring 0.15×1.25×2.5 cm were also grit-blasted. Both graphite and carbon-carbon samples were successfully coated with cordierite, beta-spodumene and niobium as a top coat using the plasma spray parameters previously shown in Table I and laser annealed using laser parameters as shown in Tables IV through X below to form dense, adherent coatings having excellent thermal shock properties and providing protection against atomic oxygen.

TABLE II

| | Thermal and Mechanical Properties of Substrates | | | | | |
|---|---|---|---|---|---|---|
| Substrate | Bulk Density (mg/$m^3$) | Grain Size (micron) | Coefficient of Thermal Expansion (/°C.) | Porosity (%) | Thermal Conductivity (W/m °C.) | Modulus of Elasticity (GPa) |
| Graphite (Stackpole Grade 2191) | 1.72 | 40 | $3.4 \times 10^{-6}$ WG* $3.8 \times 10^{-6}$ AG** | 21 | 127.6 WG* 115.7 AG** | 7.1 |
| Carbon—Carbon Composites (AVCO FWPF) | 1.5 | | $4.0 \times 10^{-6}$ X-Y dir. $3.6 \times 10^{-6}$ Z-dir. | <5 | 135 at 260° C. X or Y-dir. 216 at 326° C. X or Y-dir. 98 at 260° C. Z-dir. | |

TABLE II-continued

Thermal and Mechanical Properties of Substrates

| Substrate | Bulk Density (mg/m$^3$) | Grain Size (micron) | Coefficient of Thermal Expansion (/°C.) | Porosity (%) | Thermal Conductivity (W/m °C.) | Modulus of Elasticity (GPa) |
|---|---|---|---|---|---|---|
| | | | (up to 2200° C.) | | 64 at 816° C. Z-dir. | |

*WG = with grain
**AG = against grain

TABLE III

Thermal and Mechanical Properties of Powders

| Powder | Crystal Formation | Bulk Density (gm/cm$^3$) | Thermal Expansion (/°C.) | Thermal Conductivity (cal/cm, sec, °C. at 20° C.) | Melting Point (°C.) | Hardness (MOHS) |
|---|---|---|---|---|---|---|
| Cordierite (Muscle Shoals Mineral Grade 17 MAS) | Othorhombic | 1.36 | $2.3 \times 10^{-6}$ between 20° C. and 700° C. | 0.002 | 1470 | 7 |
| Beta-spodumene (Foote Mineral) | | 1.78 | $9 \times 10^{-7}$ between 20° C. and 1000° C. | | 1400 | — |
| Fused quartz (GEM 435) 100% amorphous | translucent hexagonal prisms | 2.2 | $5.5 \times 10^{-7}$ | | 1755 | 7 |
| Niobium | | 8.57 | $9 \times 10^{-6}$ | 0.537 | 2468 | — |

Characterizing the plasma-sprayed and laser-annealed coatings and their crystallographic phases involved identifications with X-ray diffraction patterns. Microstructrual characterization was performed using a scanning electron microscope and an optical microscope.

Plasma-sprayed and laser-annealed coatings were subject to furnace heating at 708 K. for 30 minutes, removed from the furnace and dropped into liquid nitrogen to test the survivability of the coatings under thermal shock conditions. The coatings were thermally cycled by oven heating and liquid nitrogen cooling for three cycles. The samples were also tested by thermal cycling from 1008 K. to 77 K. and 1373 K. to 77 K. Several coated and uncoated samples were heated using a 600 Watt continuous wave $CO_2$ laser to determine the effect of intense laser irradiation on the coatings. Adherence of the coating was observed from cross-sectional views of scanning electron micrographs and was also evidenced by the scratch test method.

The results of the characterization of the coated carbon-carbon and graphite samples were used to determine the optimal materials, coating conditions and laser processing parameters for producing oxidation-resistant coatings. Optimal laser processing parameters to fabricate a dense, crack-free, oxidation-resistant coating are highlighted in Tables IV through X.

X-ray diffraction patterns of cordierite and beta-spodumene powder, plasma sprayed and laser annealed as a function of laser power density and as compared with the plasma-sprayed, as-deposited coatings showed that the plasma-sprayed, as-deposited coatings were amorphous and laser annealing resulted in crystallizing of the coatings. The degree of crystallization increased with an increase of laser power density as shown in FIGS. 16 and 17.

In the cordierite coatings, spinel magnesium aluminate ($MgAl_2O_4$), cordierite, quartz and corundum phases were identified. In the beta-spodumene coatings, quartz and corundum phases were observed. The absence of a lithium phase in the beta-spodumene coatings is perhaps due to lithium going into the glassy phase or being vaporized during the annealing process.

Figure 3B:
FIG. 3 shows scanning electron secondary images of cordierite coatings on graphite substrates.
Figure 3A:
Figure 3C:
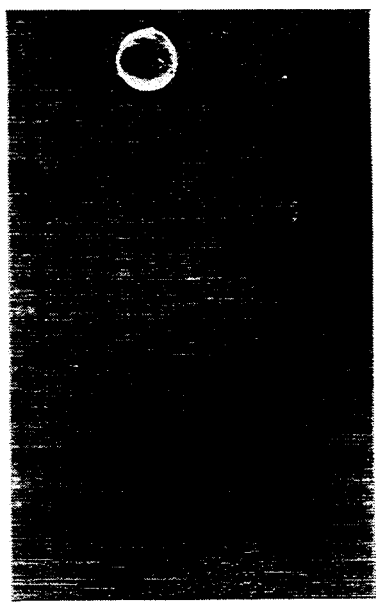
Figure 4A:
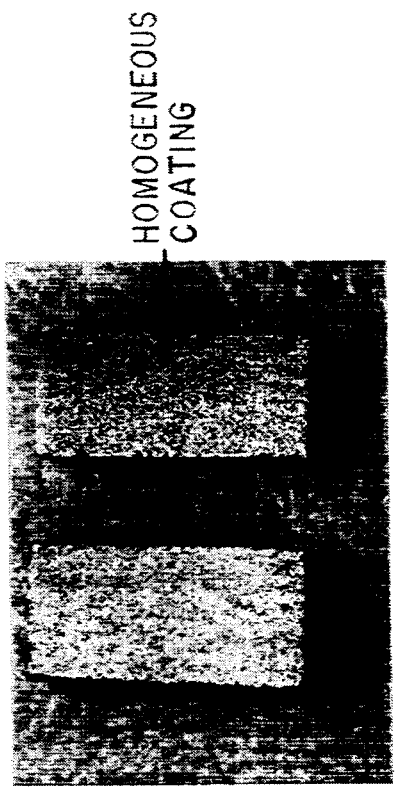
FIG. 4 shows optical photographs of beta-spodumene coatings plasma-sprayed at 760 Torr on graphite substrates, as a function of laser power density, at a scanning rate of 0.25 cm/second (2×).
Figure 4B:
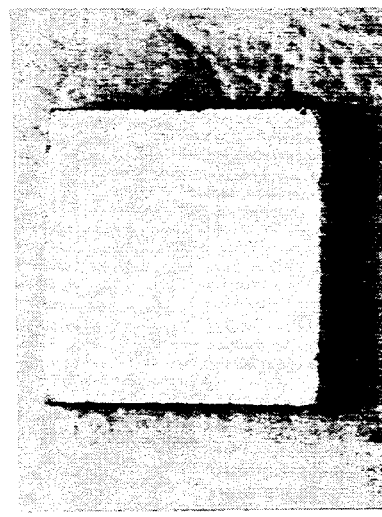
Figure 4C:
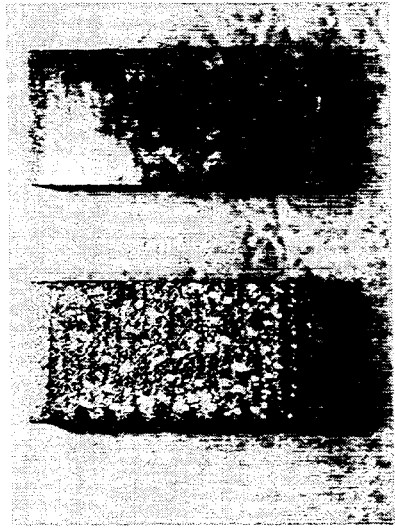
Figure 4D:
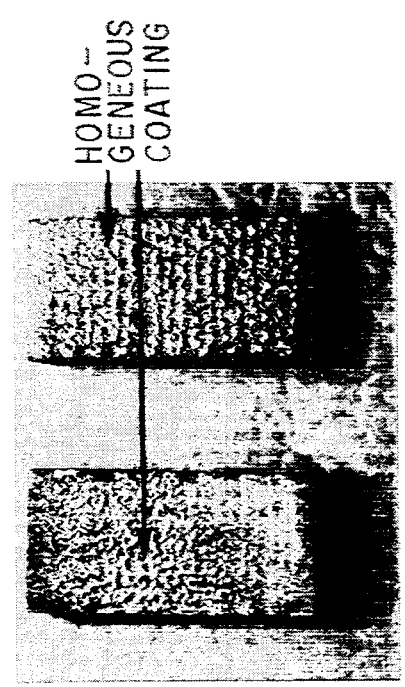
Figure 5B:
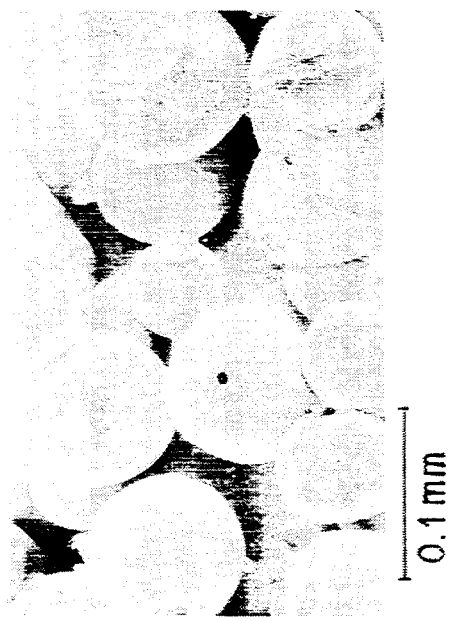
FIG. 5 shows scanning electron secondary images of beta-spodumene coatings on graphite substrates.
Figure 5A:
Figure 5C:
Figure 6A:
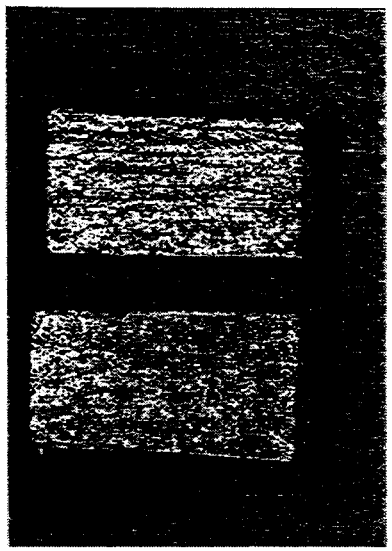
FIG. 6 shows optical photographs of cordierite with top coats of niobium plasma-sprayed at 760 Torr on graphite substrates, as a function of laser power density, at a scanning rate of 0.25 cm/second (2×).
Figure 6B:
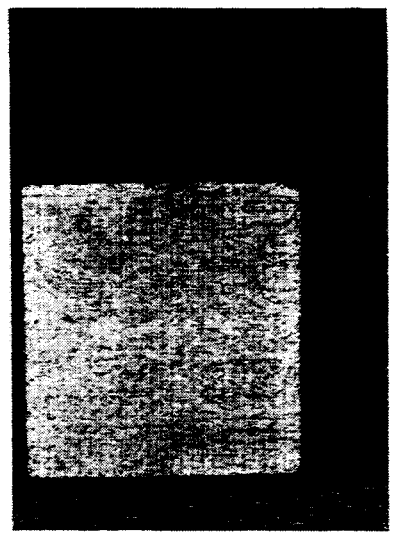
Figure 6C:
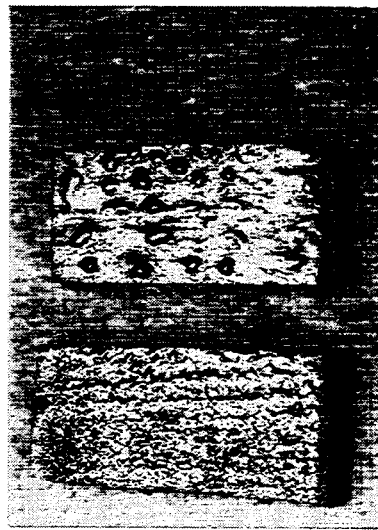

FIGS. 2 and 4 show typical optical photographs of cordierite and beta-spodumene as a function of laser power density, respectively. Tables IV through X list the characteristic features of various coatings as a function of laser parameters as optically observed under 125× magnification. The optimal laser processing parameters to fabricate a dense, crack-free, oxidative-resistant coating are highlighted in each table. FIGS. 3 and 5 show scanning electron secondary images of crystalline, dense cordierite coatings and crack-free beta-spodumene coatings, respectively, plasma-sprayed and laserannealed on graphite substrates as compared with the spherulitic morphology of the plasma-sprayed, as-deposited coatings.

Figure 8A:
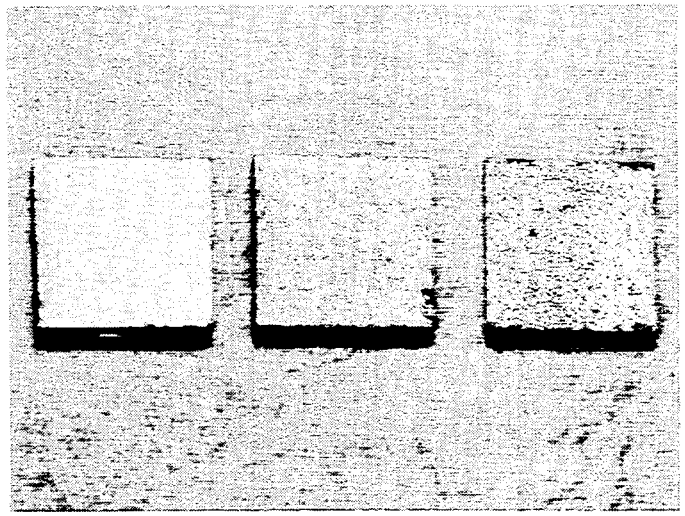
FIG. 8 shows optical photographs of cordierite and beta-spodumene coatings plasma-sprayed at 760 Torr on carbon-carbon substrates, as a function of laser power density, at a scanning rate of 0.25 cm/second (2×).
Figure 8B:
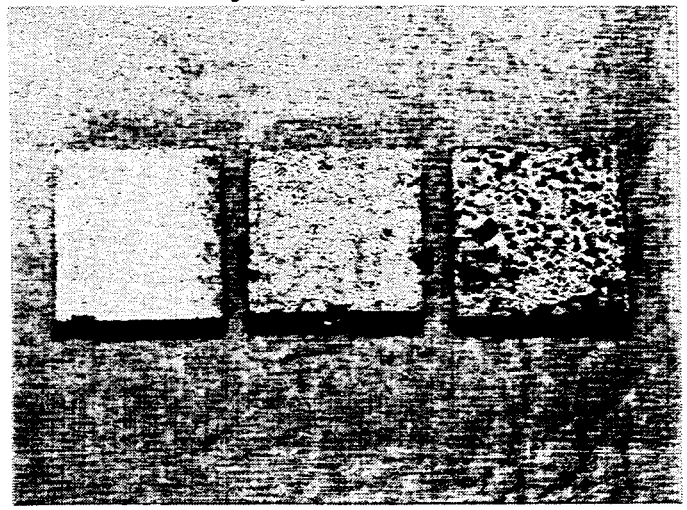

FIG. 8 shows the optical photographs of plasma-sprayed, as-deposited coatings and laser-annealed coatings of cordierite and beta-spodumene on carbon-carbon composites as a function of laser power density.

Figure 10B:
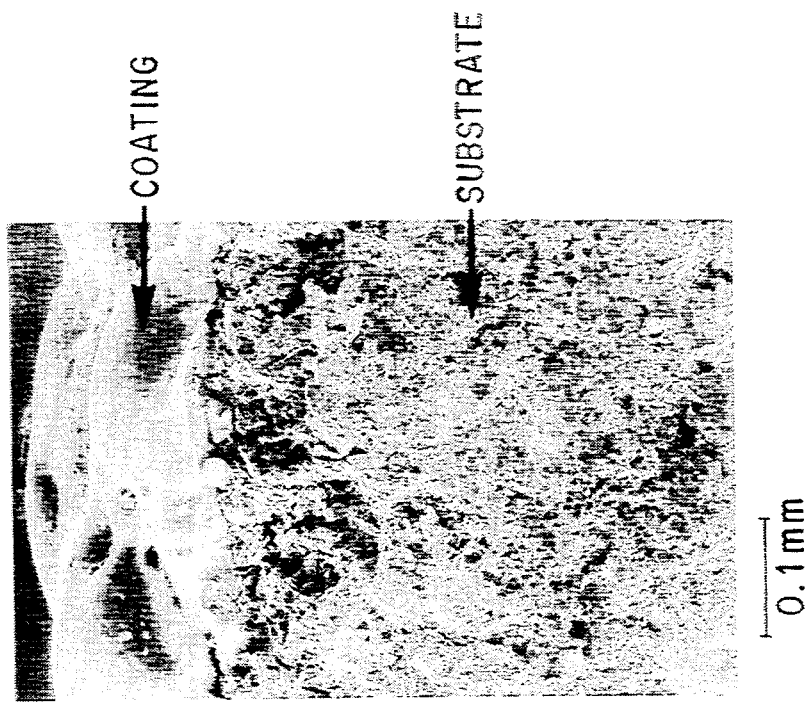
FIG. 10 shows scanning electron micrographs showing a cross-sectional view of beta-spodumene coatings on graphite substrates.
Figure 10A:
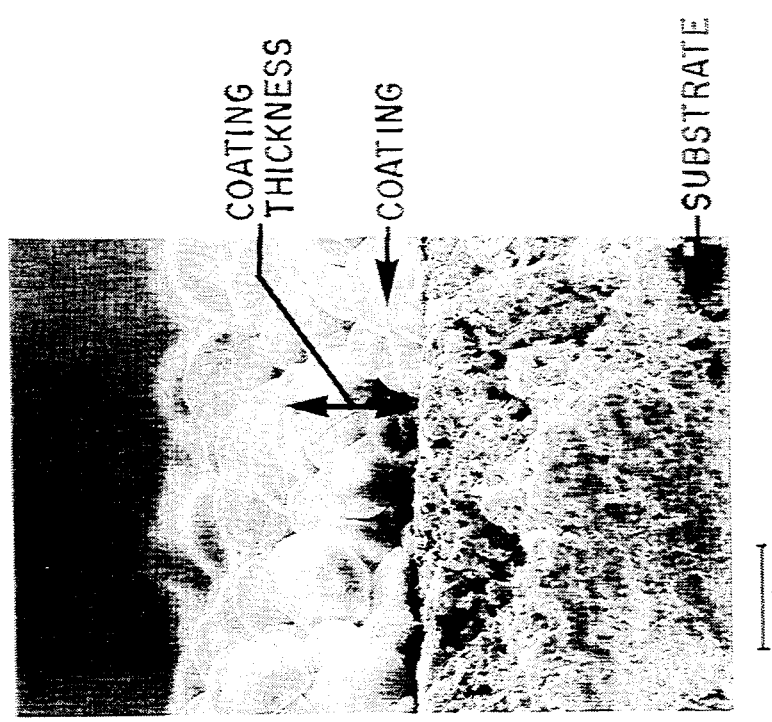
Figure 12B:
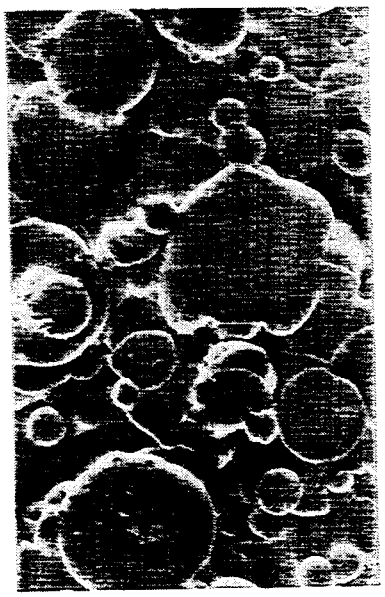
FIG. 12 shows secondary electron images of cordierite coatings on graphite substrates, plasma sprayed at various pressures and laser annealed.
Figure 12D:
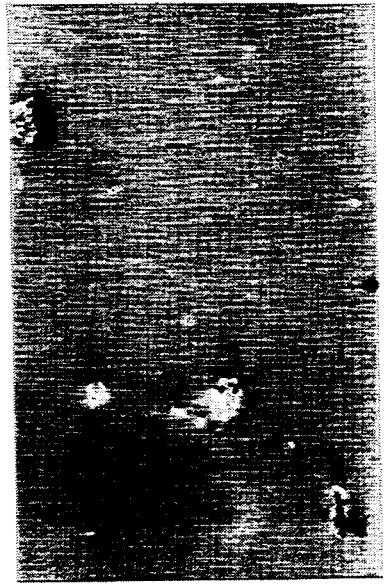
Figure 12A:
Figure 12C:
Figure 13A:
FIG. 13 shows optical micrographs of thermally-treated coatings on carbon-carbon composites at temperatures between 1010 K. and 77 K., plasma-sprayed at 760 Torr, laser-annealed at 382 W/cm$^2$ at a scanning rate of 0.25 cm/second (30×).
Figure 13B:
Figure 13C:
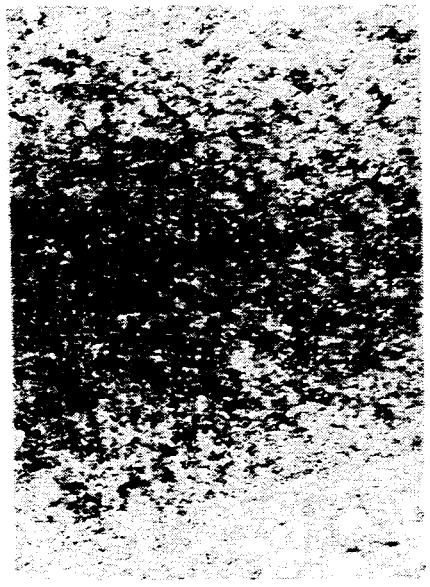
Figure 13D:
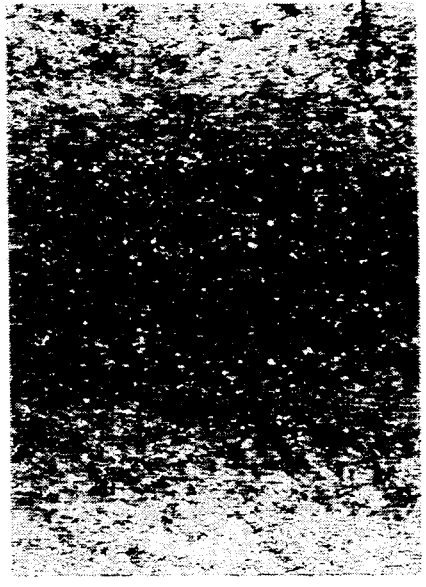
Figure 14A:
FIG. 14 shows optical micrographs of coatings, plasma sprayed at 760 Torr and laser annealed on graphite substrates, (30×), before and after thermal cycling.
Figure 14B:
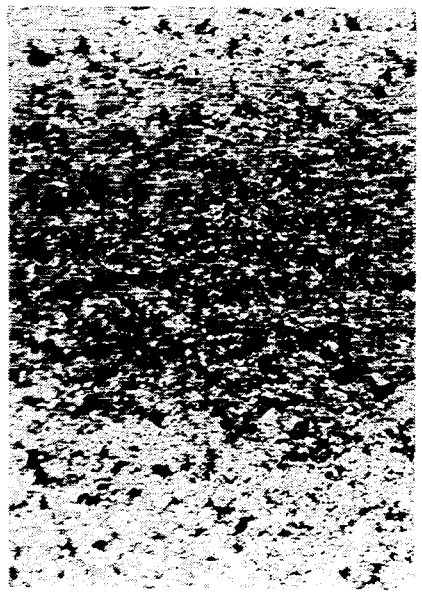
Figure 14C:
Figure 14D:
Figure 15A:
FIG. 15 shows optical micrographs of cordierite coatings plasma sprayed at 200 Torr and laser annealed on graphite substrates, before and after thermal cycling (30×).
Figure 15B:
Figure 15C:
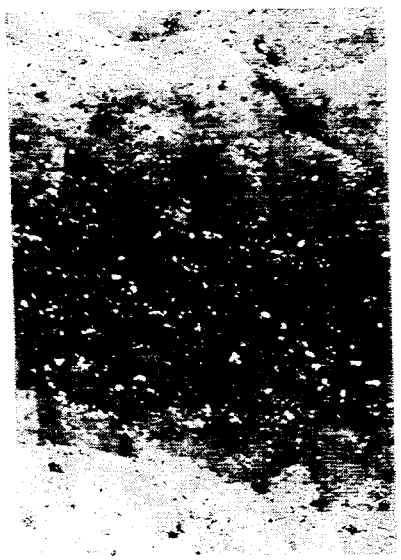
Figure 15D:
Figure 16A:
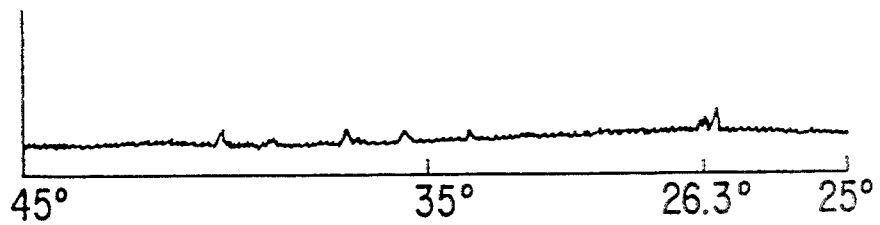
FIG. 16 shows X-ray diffraction pattern of cordierite coatings plasma sprayed at 760 Torr on graphite substrates as a function of laser power density at a scanning rate of 0.25 cm/sec.
Figure 16B:
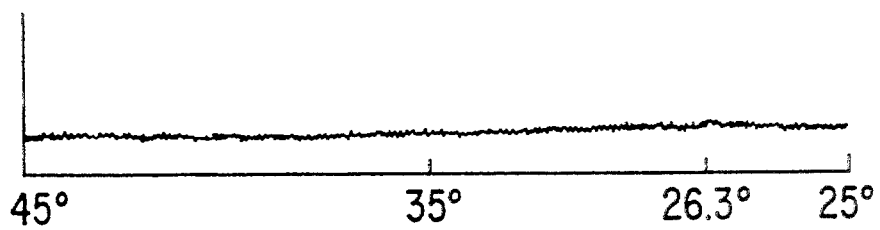
Figure 16C:
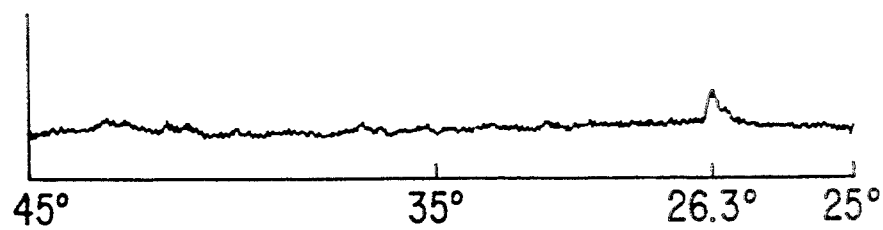
Figure 16D:
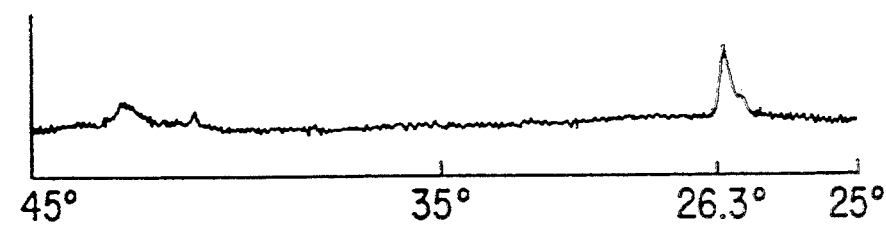
Figure 16E:
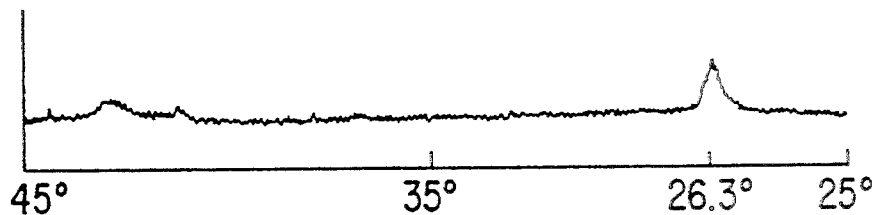
Figure 16F:
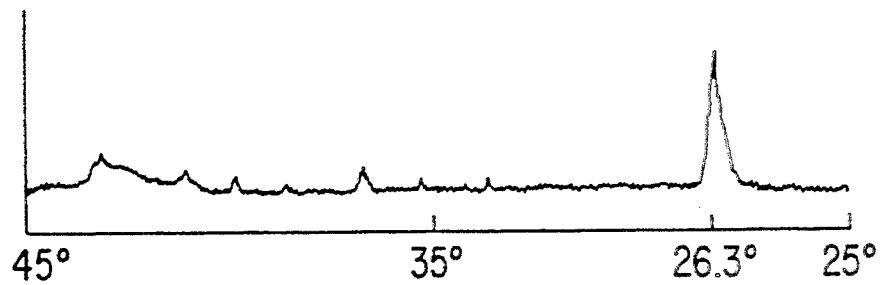
Figure 16G:
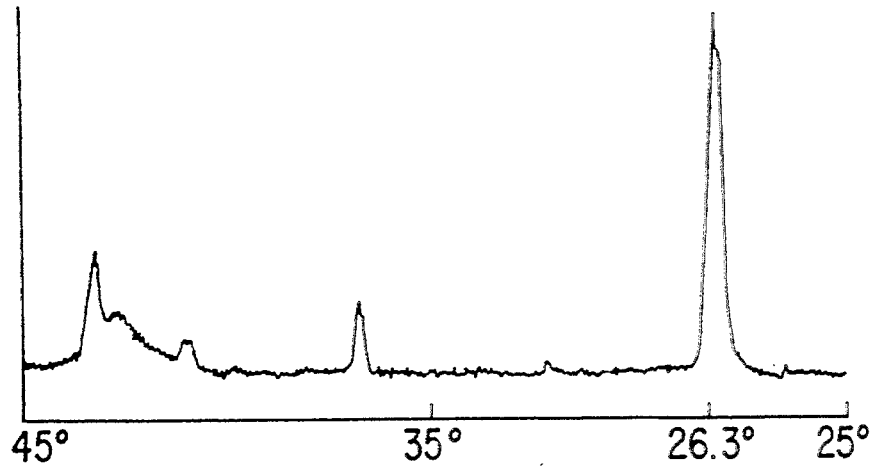
Figure 17A:
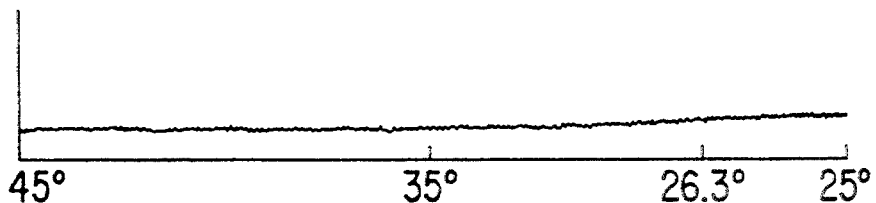
FIG. 17 shows X-ray diffraction patterns of beta-spodumene coatings plasma sprayed at 760 Torr on graphite substrates as a function of laser power density at a scanning rate of 0.25 cm/sec.
Figure 17B:
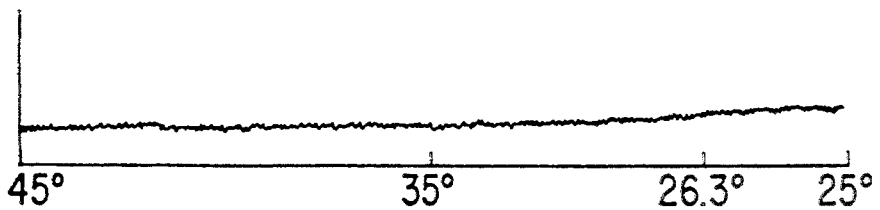
Figure 17C:
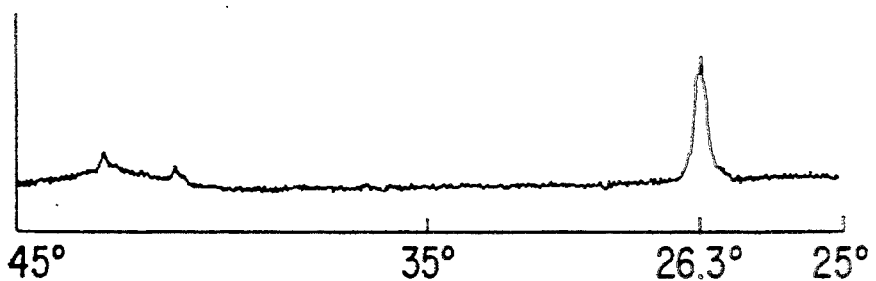
Figure 17D:
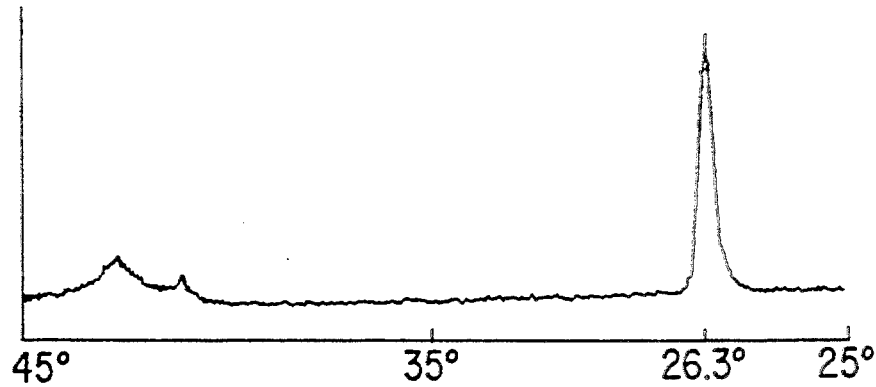
Figure 17E:
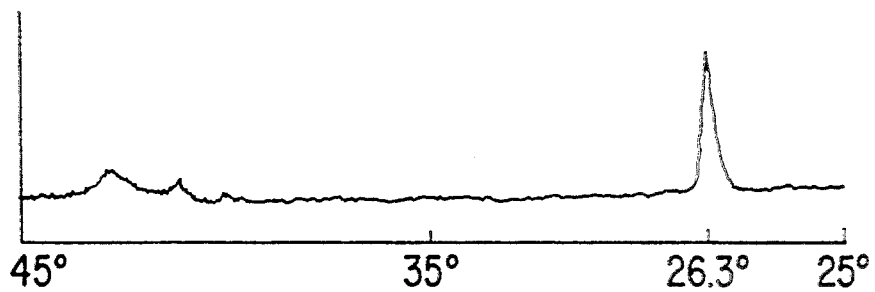
Figure 17F:
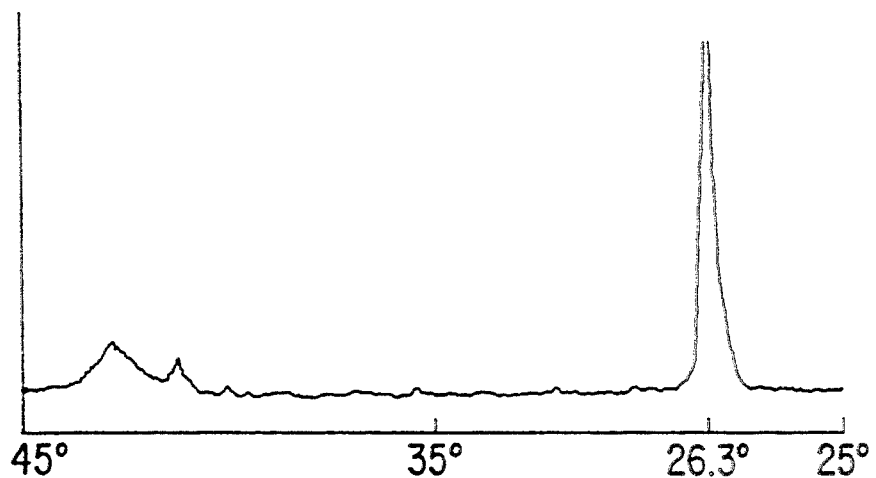

FIGS. 9 and 10 are the scanning election micrographs showing a cross-sectional view of cordierite and beta-spodumene plasma-sprayed, as-deposited coatings and laser-annealed coatings, respectively, indicating the adherence of the coating to the graphite substrate. It is inferred from FIG. 9 that identical laser power density with a slower scan rate increases the adherence of the coating by improving upon the flow properties of the coating materials. A comparative view of plasma-sprayed, laser-annealed coatings at a laser power density of 740 W/cm$^2$ with a scanning rate of 0.25 cm/sec and plasma-sprayed, laser-annealed coatings at a laser power density of 740 W/cm$^2$ with a scanning rate of 1.27 cm/sec clearly substantiates the inference drawn due to the increased laser/material interaction time at lower scan rates.

TABLE IV

Laser Parameters Investigated on Cordierite Coatings Plasma Sprayed at 760 Torr on Graphite Substrates. (125 ×).

| Sample | Laser Power Density (Watts/cm$^2$) | Scanning Rate (cm/sec) | Remarks (optically observed) |
|---|---|---|---|
| As-deposited | 0 | | Transparent spheurlitic morphology |
| UV3 | 238 | 0.25 | Transparent spherulitic morphology |
| UV4 | 515 | 0.25 | Semi-melted coating |
| UV7 | 743 | 0.25 | Homogeneous melting |
| UV5 | 990 | 0.25 | Coating with formation of glassy beads |
| UV6 | 1238 | 0.25 | Coating with formation of small white beads |
| UV8 | 1485 | 0.25 | Coating with formation of large white beads |
| UV14 | 495 | 1.27 | Semi-melted coating |
| UV13 | 743 | 1.27 | Good sample, homogeneous melting |
| UV12 | 990 | 1.27 | Homogeneous, melting cracks |
| UV11 | 1238 | 1.27 | Glassy coating, phases separated |
| UV10 | 1485 | 1.27 | Glassy coating, phases separated |
| UV9 | 1980 | 1.27 | Glassy coating, phases separated |
| UV19 | 990 | 5.08 | Semi-melted coating |
| UV18 | 1238 | 5.08 | Homogeneous melting, cracks |
| UV17 | 1485 | 5.08 | Good homogeneous melting, cracks |
| UV16 | 1980 | 5.08 | Homogeneous melting, cracks |
| UV15 | 2302 | 5.08 | Inhomogeneous melting, phases separated |

TABLE V

Laser Parameters Investigated on Beta-spodumene Coatings Plasma Sprayed at 760 Torr on Graphite Substrates. (125 ×).

| Sample | Laser Power Density (Watts/cm$^2$) | Scanning Rate (cm/sec) | Remarks (optically observed) |
|---|---|---|---|
| As-deposited | 0 | | Transparent spherulitic morphology |
| UV21 | 247 | 0.25 | Unmelted spherulitic morphology |
| UV22 | 494 | 0.25 | Semi-melted coating |
| UV23 | 740 | 0.25 | Homogeneous melting |
| UV24 | 987 | 0.25 | Formation of glassy beads |
| UV25 | 1234 | 0.25 | Formation of glassy beads |
| UV26 | 1481 | 0.25 | Formation of white beads, phases separated |
| UV27 | 1974 | 0.25 | Coating vaporized |
| UV28 | 494 | 1.27 | Semi-melted homogeneous coating |
| UV29 | 740 | 1.27 | Semi-melted homogeneous coating |
| UV30 | 987 | 1.27 | Bubblicious homogeneous coating |
| UV31 | 1234 | 1.27 | Homogeneous coating, cracks |
| UV32 | 1481 | 1.27 | Homogeneous coating, cracks |
| UV33 | 1728 | 1.27 | Formation of small white beads, phases separated |
| UV34 | 1974 | 1.27 | Formation of large white beads, phases separated |
| UV35 | 987 | 5.08 | Melting with holes |
| UV36 | 1234 | 5.08 | Homogeneous melting |
| UV37 | 1481 | 5.08 | Homogeneous melting |
| UV38 | 1728 | 5.08 | Homogeneous melting, cracks |
| UV39 | 1974 | 5.08 | Homogeneous melting, cracks |
| UV40 | 2222 | 5.08 | Inhomogeneous melting, cracks |
| UV41 | 2468 | 5.08 | Inhomogeneous white clusters |

TABLE VI

Laser Parameters Investigated on Cordierite Coatings Plasma Sprayed at 200 Torr on Graphite Substrates. (125 ×).

| Sample | Laser Power Density (Watts/cm$^2$) | Scanning Rate (cm/sec) | Remarks (optically observed) |
|---|---|---|---|
| As-deposited | 0 | | Very dense semi-melted spherulitic morphology |
| UV69 | 255 | 0.25 | Dense, semi-melted, spherulitic morphology |
| UV66 | 509 | 0.25 | Dense coating, cracks |
| UV67 | 764 | 0.25 | Dense coating, cracks |
| UV68 | 1019 | 0.25 | Bubbled dense coating, cracks |
| UV70 | 509 | 1.27 | Homogeneous dense coating, cracks |
| UV71 | 764 | 1.27 | Homogeneous dense coating, cracks |
| UV72 | 1019 | 1.27 | Good homogeneous dense coating, cracks |
| UV73 | 1273 | 1.27 | Homogeneous dense coating, cracks |
| UV74 | 1527 | 1.27 | Bubblicious dense coating |
| UV76 | 764 | 5.08 | Semi-melted dense spherulitic morphology |
| UV77 | 1019 | 5.08 | Semi-melted dense spherulitic morphology |
| UV78 | 1273 | 5.08 | Semi-melted dense spherulitic morphology |
| UV79 | 1527 | 5.08 | Homogeneous dense melted coating, cracks |
| UV80 | 1783 | 5.08 | Homogeneous dense coating, cracks |
| UV81 | 2037 | 5.08 | Homogeneous coating, poor adherence |

TABLE VII

Laser Parameters Investigated on Cordierite With Niobium Top Coat Plasma Sprayed at 760 Torr on Graphite Substrates. (125 ×).

| Sample | Laser Power Density (Watts/cm$^2$) | Scanning Rate (cm/sec) | Remarks (optically observed) |
|---|---|---|---|
| As-deposited | 0 | | Transparent dense spherulitic morphology |
| UV83 | 255 | 0.25 | Transparent dense spherulitic morphology |
| UV84 | 509 | 0.25 | Semi-melted spherulitic morphology |
| UV85 | 763 | 0.25 | Semi-melted glassy spherulitic morphology |
| UV86 | 1018 | 0.25 | Good homogeneous dense coating |
| UV87 | 1273 | 0.25 | Homogeneous coating |
| UV88 | 1528 | 0.25 | Homogeneous coating |
| UV89 | 1783 | 0.25 | Dark glassy coating |
| UV90 | 2037 | 0.25 | Dark big glassy beads on homogeneous coating |
| UV91 | 1018 | 1.27 | Dense glassy coating |
| UV92 | 1273 | 1.27 | Dense glassy coating |
| UV93 | 1528 | 1.27 | Dense glassy coating |
| UV94 | 1783 | 1.27 | Dense glassy coating |
| UV95 | 2037 | 1.27 | Dense glassy coating, cracks |

TABLE VII-continued

Laser Parameters Investigated on Cordierite With Niobium Top Coat Plasma Sprayed at 760 Torr on Graphite Substrates. (125 ×).

| Sample | Laser Power Density (Watts/cm²) | Scanning Rate (cm/sec) | Remarks (optically observed) |
|---|---|---|---|
| UV96 | 2292 | 1.27 | Dense glassy coating, cracks, glassy bead formation |
| UV97 | 1528 | 5.08 | Dense glassy coating |
| UV98 | 2037 | 5.08 | Dense glassy coating |
| UV99 | 2292 | 5.08 | Formation of white clusters |
| UV100 | 2546 | 5.08 | Darker glassy coating, cracks |
| UV101 | 2801 | 5.08 | Darker glassy coating |
| UV102 | 3056 | 5.08 | Darker glassy coating |

TABLE VIII

Laser Parameters Investigated on Beta-Spodumene With Niobium Top Coat Plasma Sprayed at 760 Torr on Graphite Substrates. (125 ×).

| Sample | Laser Power Density (Watts/cm²) | Scanning Rate (cm/sec) | Remarks (optically observed) |
|---|---|---|---|
| As-deposited | 0 | | Dense glassy spherulitic morphology |
| UV58 | 255 | 0.25 | Dense glassy spherulitic morphology |
| UV59 | 509 | 0.25 | Semi-melted spheruliti morphology |
| UV60 | 763 | 0.25 | Good semi-melted glassy coating |
| UV61 | 1018 | 0.25 | Homogeneous glassy coating |
| UV62 | 1273 | 0.25 | Homogeneous glassy coating |
| UV63 | 1528 | 0.25 | Homogeneous dark glassy coating |
| UV64 | 1783 | 0.25 | Homogeneous dark glassy coating |
| UV65 | 2037 | 0.25 | Homogeneous glassy coating |
| UV103 | 1018 | 1.27 | Dense glassy speherulitic morphology |
| UV104 | 1528 | 1.27 | Semi-melted dense spherulitic morphology |
| UV105 | 1783 | 1.27 | More melted coating than UV104 |
| UV106 | 2037 | 1.27 | Bubblicious coating, cracks |
| UV107 | 2546 | 1.27 | Dark homogeneous coating, cracks |
| UV108 | 3056 | 1.27 | Dark homogeneous glassy coating |
| UV109 | 2037 | 5.08 | Semi-melted spherulitic morphology |
| UV110 | 2546 | 5.08 | Homogeneous dark glassy coating |
| UV111 | 3056 | 5.08 | Homogeneous dark glassy coating |
| UV112 | 3412 | 5.08 | Homogeneous dark glassy coating |

TABLE IX

Laser Parameters Investigated on Cordierite Coatings Plasma Sprayed at 760 Torr on Carbon—Carbon Substrates. (125 ×).

| Sample | Laser Power Density (Watts/cm²) | Scanning Rate (cm/sec) | Remarks (optically observed) |
|---|---|---|---|
| As-deposited | 0 | 0.25 | Transparent spherulitic morphology |
| UV126 | 255 | 0.25 | Transparent dense glassy spherulitic morphology |
| UV128 | 382 | 0.25 | Homogeneous glassy |
| UV127 | 509 | 0.25 | Formation of glassy beads |
| UV130 | 764 | 0.25 | Formation of glassy beads |
| UV129 | 1019 | 0.25 | Formation of glassy beads |

TABLE X

Laser Parameters Investigated on Beta-Spodumene Coatings Plasma Sprayed at 760 Torr on Carbon—Carbon Substrates. (125 ×).

| Sample | Laser Power Density (Watts/cm²) | Scanning Rate (cm/sec) | Remarks (optically observed) |
|---|---|---|---|
| As-deposited | 0 | 0.25 | Semi-melted glassy spherulitic morphology |
| UV131 | 255 | 0.25 | |
| UV132 | 382 | 0.25 | Homogeneous glassy coatings |
| UV133 | 509 | 0.25 | Porous and bubblicious glassy coating |
| UV134 | 637 | 0.25 | |

FIG. 11 shows the optical micrographs of cordierite coatings plasma sprayed at 200 Torr on graphite substrates as a function of laser power density at a scanning rate of 1.27 cm/sec. It has been observed that for a constant scanning rate, lower laser power density results in a large number of microcracks, whereas with increasing laser power density fewer cracks are formed resulting in an improved quality of the coating.

From the statistical data it has been observed that faster laser scans and higher laser power density result in less phase separation with fewer cracks. This is perhaps due to the fact that higher scan rates and higher laser power density result in rapid melting and solidification of the crystalline phase, resulting in fewer wide-ranging variations of phase assemblies. The difference in thermal expansion coefficient between the phases present in the coating gives rise to boundary stresses, which are frequently sufficient to initiate small cracks.

FIG. 12 shows a comparative study between plasma-sprayed, as-deposited coatings and plasma-sprayed, laser-annealed coatings when sprayed at atmospheric pressure (760 Torr) and at low pressure (200 Torr). The plasma-sprayed, as-deposited coatings at 200 Torr were observed to be more dense than those at 760 Torr as shown in FIGS. 12a and 12b, whereas after laser annealing the density and microstructure appeared to be identical for both cases shown in FIG. 12c and 12d. The laser annealing technique successfully recrystallized the amorphous glass-ceramic powders, and is expected to result in coatings close to the theoretical density eliminating the need to plasma spray at subatmospheric pressures. The absence of porosity is related to the fact that changes in volume can be accommodated by the flow characteristics of the glass ceramics.

FIGS. 13, 14 and 15 show optical micrographs of the coatings when subjected to thermal shock treatment in comparison with the untreated coatings. No microstructural change was observed in cordierite and beta-spodumene coatings on carbon-carbon composites and graphite substrates when subjected three times to thermal cycling between 1010 K. and 77 K. as shown in FIGS. 13 and 14, respectively. In FIG. 13, the black hair-like features are the carbon fibers released from the uncoated carbon-carbon composite surface. The coated surface was observed to be undamaged. Laser-annealed cordierite coatings tested under the thermal cycle of 1373 K. and 77 K. were also observed to be microstructurally undamaged as shown in FIG. 15. Niobium-alloyed cordierite and beta-spodumene coatings survived 708 K. to 77 K. thermal cycling, but not 1010 K. thermal cycling.

In sum, beta-spodumene, cordierite and layered coatings of ceramic and niobium were successfully deposited onto graphite and carbon-carbon composite materials. Laser annealing of plasma-deposited coatings resulted in the formation of crystalline structures having good adherence and being close to theoretical density. Laser annealing of atmospherically plasma-sprayed coatings also produced a coating of similar density and microstructure to that produced by low pressure plasma deposition. The laser-enhanced crystallization process occurred in fractions of a second as opposed to furnace sintering at 950° C. which takes from 6 to 48 hours.

Laser annealed ceramic coatings of cordierite and beta-spodumene with a niobium top coat were observed to be free of cracks at a number of laser power densities and scanning rates. A range of laser annealing parameters resulted in dense, homogeneous coatings in beta-spodumene and cordierite having reduced crack densities. Scanning electron microscopy indicated the adherence of laser annealed coatings on graphite samples. Such adherence was ostensibly the result of flow properties of molten glass ceramic materials over the surface of the substrate.

Plasma-deposited, laser-alloyed coatings withstood extreme thermal shock conditions without spallation or damage in the operational temperature range of coated composite materials. Laser-alloyed coatings containing niobium and either beta-spodumene or cordierite survived thermal shock resulting from heating to 725 K. and immediate immersion in a liquid nitrogen (77 K.) bath. Carbon-carbon composite materials coated with beta-spodumene and cordierite were observed to be undamaged after heating to 1003 K. followed by immersion in liquid nitrogen (77 K.), and the coatings were adherent to the substrates. Low pressure plasma deposited (LPPD) cordierite coatings on graphite survived thermal shock from 1375 K. to 77 K. with no appreciable damage. Coated carbon-carbon and graphite materials survived three thermal cycles at high temperatures ranging from 1375 K. to 1003 K. and low temperatures of 77 K. with a maximum cycle length of 4 hours without oxidation damage. The adherence of the alumino-silicate coatings to carbon-carbon and graphite substrates, production of niobium-rich multiple-layer coatings which remained relatively defect-free after laser alloying, and the resulting oxidation resistant refractory metal-oxide alloyed and nonalloyed alumino-silicate coatings at temperatures expected during LEO demonstrate the utility of the present invention.

The conditions set forth in the foregoing example are illustrative of various embodiments of the composition and the process of this invention, employing the concept of laser alloying and annealing plasma-sprayed alumino-silicates to form a protective coating on carbon-carbon composite and graphitic substrate materials. The illustrative conditions can be varied in many ways by one skilled in the art. Substitutions, modifications and alterations are permissible without departing from the spirit and scope of the invention as defined in the following claims.

We claim:

1. A method for fabricating a glass-ceramic coated carbon-carbon or graphitic substrate material comprising the steps of:
   a. plasma-spraying a beta-quartz, beta-spodumene, cordierite or beta-eucryptite powder to form an amorphous film having a thickness of up to about 1000 microns on the surface of said substrate; and
   b. recrystallizing said amorphous film by scanning with a laser beam at a laser power density in the range of from about 100 to about 3000 W/cm$^2$ and a laser scan rate in the range of from about 0.05 to about 7.5 cm/second.

2. The method of claim 1, wherein said powder is beta-quartz.

3. The method of claim 1, further comprising, before said step b and after step a, the step of applying a top coat of an alloying agent, comprising a refractory metal or a refractory metal oxide, nitride or silicide, on said amorphous film.

4. The method of claim 3, wherein said alloying agent is a refractory metal-oxide or nitride selected from the group consisting of $ZrO_2$, $HfO_2$, $Y_2O_3$, $Ta_2O_5$, $Mo_2O_3$, $Si_3N_4$, HfN and ZrN.

5. The method of claim 1, wherein said powder has a size in the range of from about 10 to about 140 microns.

6. The method of claim 5, wherein said powder has a size in the range of from about 60 to about 90 microns.

7. The method of claim 1, wherein said laser power density is in the range of from about 100 W/cm$^2$ to about 2500 W/cm$^2$.

8. The method of claim 1, wherein said laser scan rate is in the range of from about 5.0 to about 7.0 cm/sec.

9. The method of claim 1, wherein said plasma spraying step occurs at a pressure in the range of up to about 760 Torr.

10. The method of claim 9, wherein said plasma spraying step occurs at a pressure of about 760 Torr.

11. The method of claim 1, further comprising the initial step of roughening the surface of said substrate to a roughness in the range of from about 12.4 to about 25.4 microns root mean.square prior to said plasma-spraying step.

12. The method of claim 11, wherein said roughening step comprises the step of grit-blasting.

13. The method of claim 1, wherein said recrystallization step results in a homogeneous coating of substantially uniform grain size.

14. A method for protecting a carbon-carbon composite or graphitic substrate material against oxidation and high temperature thermal cycling up to 1725 K., comprising forming an alumino-silicate glass-ceramic coating on said substrate by the following steps:
   a. roughening an outer surface of said substrate to a roughness in a range of from about 12.4 to about 25.4 microns root mean square;
   b. plasma-spraying at a pressure of about 760 Torr a beta-spodumene powder having a size in a range of from about 44 to about 120 microns to form an amorphous film having a thickness up to about 1000 microns on said outer surface of said substrate; and
   c. recrystallizing said amorphous film by scanning with a laser beam at a laser power density in the range of from about 400 to about 2000 W/cm$^2$ and a laser scan rate in the range of from about 0.25 to about 5.10 cm/sec.

15. A method for protecting a carbon-carbon composite or graphitic substrate material against oxidation and high temperature thermal cycling up to 1725 K., comprising forming an alumino-silicate glass-ceramic coating on said substrate by the following steps:
   a. roughening an outer surface of said substrate to a roughness in the range of from about 12.4 to about 25.4 microns root mean square;
   b. plasma-spraying at a pressure of about 760 Torr a cordierite powder having a size in a range of from about −200 to about +325 mesh (44 to 120 microns) to form an amorphous film having a thickness in the range of up to 1000 microns on the surface of said substrate; and
   c. recrystallizing said amorphous film by scanning with a laser beam at a laser power density in the range of from about 400 to about 2000 W/cm$^2$ and a laser scan rate in the range of from about 0.25 to about 5.10 cm/sec.

16. A method for protecting a carbon-carbon composite or graphitic substrate material against oxidation and high temperature thermal cycling up to 1725 K., comprising forming an alumino-silicate glass-ceramic coating on said substrate by the following steps:
   a. roughening an outer surface of said substrate to a roughness in the range of from about 12.4 to about 25.4 microns root mean square;
   b. plasma-spraying at a pressure of about 200 Torr a cordierite powder having a size in the range of from about −200 to about +325 mesh (44 to 120 microns) to form an amorphous film having a thickness in the range up to about 1000 microns on said outer surface of said substrate; and
   c. recrystallizing said amorphous film by scanning with a laser beam at a laser power density in the range of from about 350 to about 1300 W/cm$^2$ and a laser scan rate in the range of from about 0.25 to about 1.27 cm/sec.

17. The method of claims 14, 15, or 16 further comprising, before said step c and after step b, the step of applying a top coat of refractory metal or a refractory metal oxide or nitride or silicate on said amorphous film.

18. The method of claim 17 wherein said refractory metal oxide or nitride is selected from the group consisting of $ZrO_2$, $HfO_2$, $Ta_2O_5$, $Mo_2O_3$, $Y_2O_3$, $Si_3N_4$, HfN, or ZrN.

* * * * *